United States Patent
Perner

(10) Patent No.: US 9,322,428 B2
(45) Date of Patent: Apr. 26, 2016

(54) LOCKING CARABINER

(71) Applicant: D B Industries, LLC, Red Wing, MN (US)

(72) Inventor: Judd J. Perner, Red Wing, MN (US)

(73) Assignee: D B Industries, LLC, Red Wing, MN (US)

( * ) Notice: Subject to any disclaimer, the term of this patent is extended or adjusted under 35 U.S.C. 154(b) by 7 days.

(21) Appl. No.: 14/192,262

(22) Filed: Feb. 27, 2014

(65) Prior Publication Data

US 2014/0245576 A1 Sep. 4, 2014

Related U.S. Application Data

(60) Provisional application No. 61/771,400, filed on Mar. 1, 2013.

(51) Int. Cl.
*F16B 45/02* (2006.01)

(52) U.S. Cl.
CPC ........... *F16B 45/02* (2013.01); *Y10T 24/45366* (2015.01)

(58) Field of Classification Search
CPC ....................................................... F16B 45/02
See application file for complete search history.

(56) References Cited

U.S. PATENT DOCUMENTS

| 370,983 | A | 10/1887 | Stahl |
| 501,875 | A | 7/1893 | Cutter |
| 1,626,866 | A | 5/1927 | Neilson |
| 1,879,168 | A | 9/1932 | Freysinger |
| 1,964,428 | A | 6/1934 | Duffy |
| 2,197,997 | A * | 4/1940 | Dee ............................. 294/82.2 |
| 4,434,536 | A | 3/1984 | Schmidt et al. |
| 4,528,728 | A | 7/1985 | Schmidt et al. |
| 4,528,729 | A | 7/1985 | Schmidt et al. |
| 4,539,732 | A | 9/1985 | Wolner |
| 4,621,851 | A | 11/1986 | Bailey, Jr. |
| 4,657,110 | A | 4/1987 | Wolner |
| 4,908,913 | A | 3/1990 | Mori |
| 4,977,647 | A | 12/1990 | Casebolt |
| 5,002,420 | A | 3/1991 | Loyd |
| 5,174,410 | A | 12/1992 | Casebolt |
| 5,257,441 | A | 11/1993 | Barlow |
| 5,687,535 | A | 11/1997 | Rohlf |
| 5,735,025 | A | 4/1998 | Bailey |
| 6,070,308 | A | 6/2000 | Rohlf |
| 6,588,076 | B1 | 7/2003 | Choate |

(Continued)

FOREIGN PATENT DOCUMENTS

| DE | 202004010008 | 9/2004 |
| JP | 0731687 | 2/1995 |

*Primary Examiner* — Jack W Lavinder
(74) *Attorney, Agent, or Firm* — Dicke, Billig & Czaja, PLLC

(57) ABSTRACT

A locking carabiner comprises a body, a gate, and a lock. The body has a side interconnecting a top and a bottom forming an opening. The gate is pivotally connected to the bottom and is releasably connectable to the top, and the gate has closed and open positions. The lock is pivotally connected to the side and has locked and unlocked positions. The lock includes a trigger portion extending outward proximate the body's rear and a locking portion extending outward proximate the body's front. The locking portion prevents the gate from moving from the closed position into the open position when in the locked position, and the locking portion is configured and arranged to allow the gate to move from the closed position into the open position when in the unlocked position.

10 Claims, 11 Drawing Sheets

(56) References Cited

U.S. PATENT DOCUMENTS

| | | |
|---|---|---|
| 6,718,601 B1 | 4/2004 | Choate |
| 6,832,417 B1 | 12/2004 | Choate |
| 7,437,806 B2 | 10/2008 | Lin |
| 7,444,723 B2 | 11/2008 | Lin |
| 7,540,074 B2 | 6/2009 | Thompson |
| 7,647,677 B2 | 1/2010 | Casebolt |
| 8,001,663 B2 | 8/2011 | Belcourt et al. |
| 8,016,073 B2 | 9/2011 | Petzl et al. |
| 8,060,994 B2 | 11/2011 | Petzl et al. |
| 2003/0167608 A1* | 9/2003 | Petzl et al. ............... 24/600.2 |
| 2008/0016659 A1* | 1/2008 | Peterson .................. 24/599.1 |

* cited by examiner

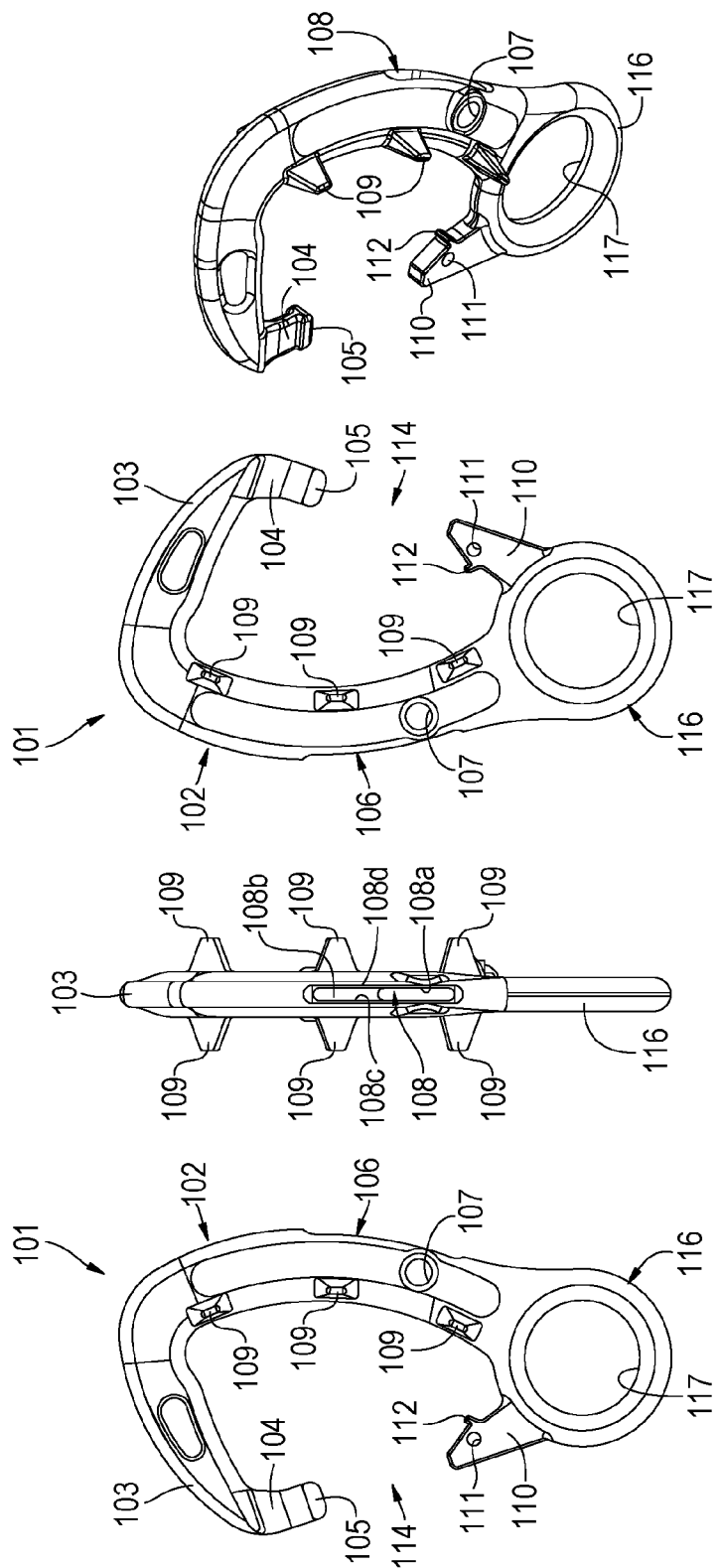

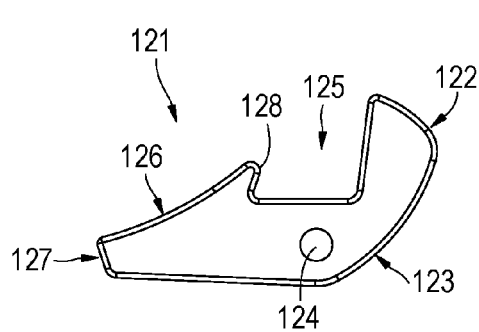 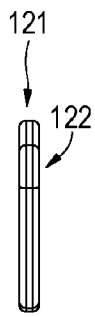 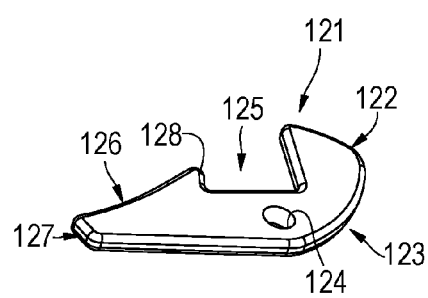
FIG. 17    FIG. 18    FIG. 19
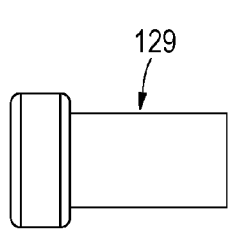 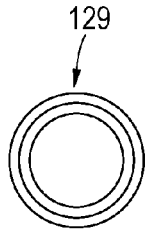 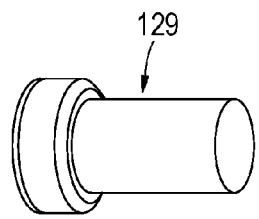
FIG. 20    FIG. 21    FIG. 22
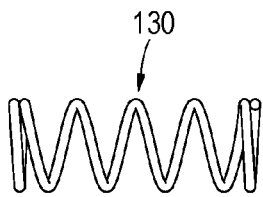 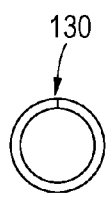 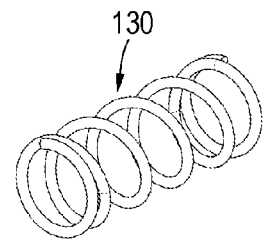
FIG. 23    FIG. 24    FIG. 25

LOCKING CARABINER

BACKGROUND OF THE INVENTION

Fall protection equipment is commonly utilized to prevent injuries to workers who climb poles to install and repair telephone equipment and the like. Such fall protection equipment typically includes a safety harness donned by the worker and fall protection equipment, such as a pole choker assembly, connecting the safety harness and the pole. The fall protection equipment allows the worker to climb up and down the pole while preventing the worker from falling to the ground should a fall event occur. A carabiner is commonly used with fall protection equipment, and the carabiner includes protrusions configured and arranged to engage the pole should a fall event occur. The carabiner also includes a gate with a locking mechanism. An example of a locking mechanism is one that requires the user to push down, twist, and pull back on the gate to open the gate. Sometimes, however, the gate portion of the carabiner is inadvertently opened during use and this could put the user at risk. Therefore, it is desired to provide a carabiner with a locking mechanism to prevent the gate portion from inadvertently opening during use.

For the reasons stated above and for other reasons stated below, which will become apparent to those skilled in the art upon reading and understanding the present specification, there is a need in the art for a locking carabiner.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a locking carabiner comprises a body, a gate, and a lock. The body has a side interconnecting a top and a bottom forming an opening, and the side includes a slot. The gate is pivotally connected to the bottom and is releasably connectable to the top. The gate has a closed position and an open position. The lock is pivotally connected to the side and has a locked position and an unlocked position. The slot is configured and arranged to receive the lock. The lock includes a trigger portion extending outward proximate a rear of the body and a locking portion extending outward proximate a front of the body. The locking portion is configured and arranged to prevent the gate from moving from the closed position into the open position when the locking portion is in the locked position, and the locking portion is configured and arranged to allow the gate to move from the closed position into the open position when the locking portion is in the unlocked position.

In one embodiment, a locking carabiner comprises a body, a gate, and a lock. The body has a side interconnecting a top and a bottom forming an opening. The gate is pivotally connected to the bottom and is releasably connectable to the top. The gate has a closed position and an open position. The lock is pivotally connected to the side and has a locked position and an unlocked position. The lock includes a trigger portion extending outward proximate a rear of the body and a locking portion extending outward proximate a front of the body. The locking portion is configured and arranged to prevent the gate from moving from the closed position into the open position when the locking portion is in the locked position. The locking portion is configured and arranged to allow the gate to move from the closed position into the open position when the locking portion is in the unlocked position. A contact angle between the gate and the locking portion of the lock is over center to prevent the gate from moving the lock from the locked position into the unlocked position.

BRIEF DESCRIPTION OF THE DRAWINGS

The present invention can be more easily understood, and further advantages and uses thereof can be more readily apparent, when considered in view of the detailed description and the following Figures in which:

FIG. 13 is a side view of a body of the locking carabiner shown in FIG. 1;

FIG. 14 is a rear view of the body shown in FIG. 13;

FIG. 15 is a side view of the body shown in FIG. 13;

FIG. 16 is a perspective view of the body shown in FIG. 13;

FIG. 17 is a side view of a lock of the locking carabiner shown in FIG. 1;

FIG. 18 is a rear view of the lock shown in FIG. 17;

FIG. 19 is a perspective view of the lock shown in FIG. 17;

FIG. 20 is a side view of a rivet of the locking carabiner shown in FIG. 1;

FIG. 21 is an end view of the rivet shown in FIG. 20;

FIG. 22 is a perspective view of the rivet shown in FIG. 20;

FIG. 23 is a side view of a spring of the locking carabiner shown in FIG. 1;

FIG. 24 is an end view of the spring shown in FIG. 23;

FIG. 25 is a perspective view of the spring shown in FIG. 23; and

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
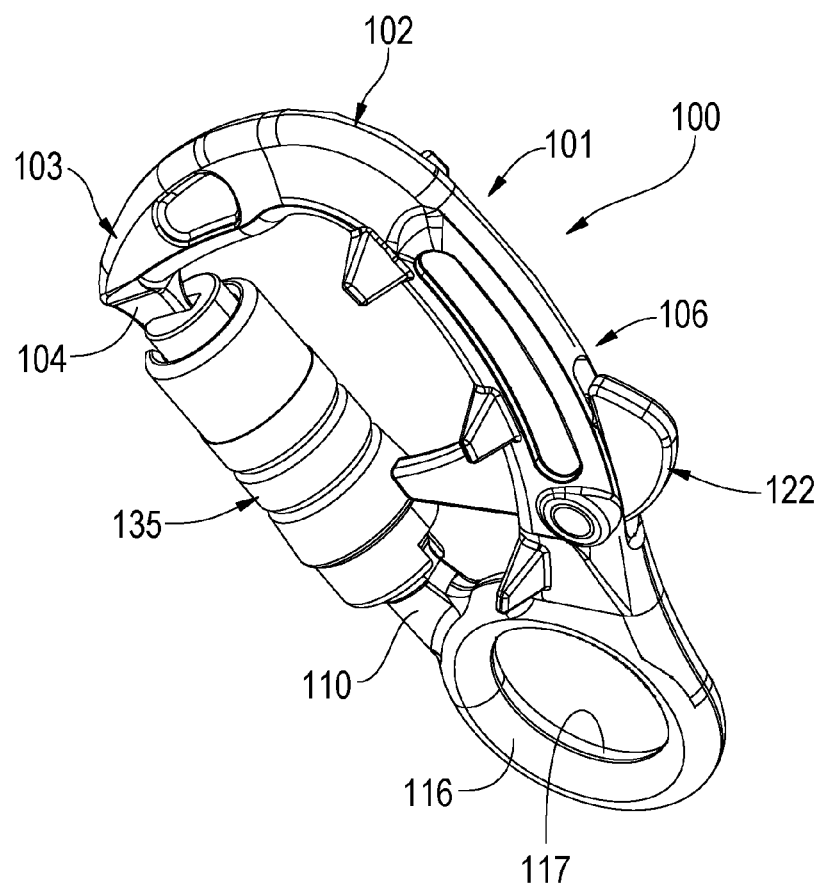
FIG. 1 is a perspective view of a locking carabiner in locked and closed positions constructed in accordance with the principles of the present invention.
Figure 4:
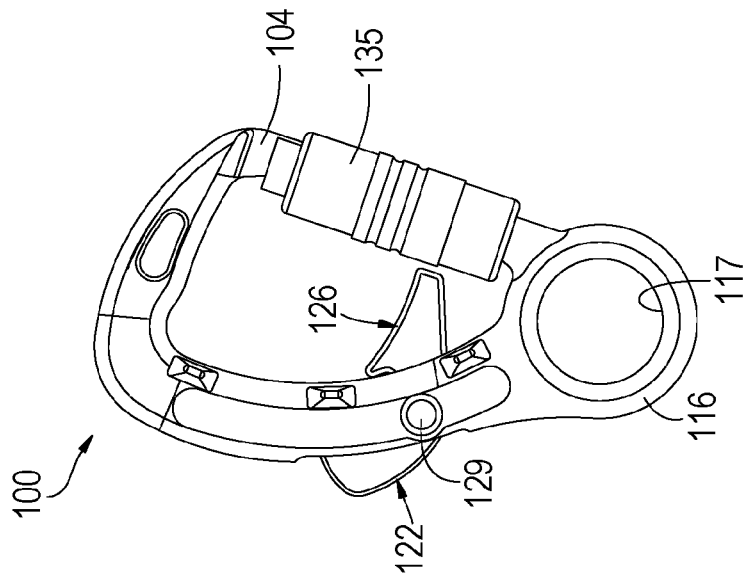
FIG. 4 is a side view of the locking carabiner shown in FIG. 1.
Figure 3:
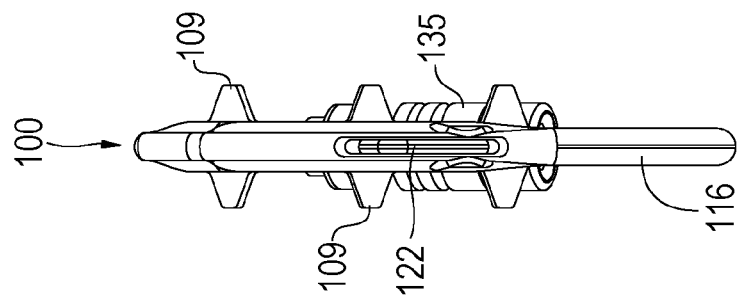
FIG. 3 is a rear view of the locking carabiner shown in FIG. 1.
Figure 2:
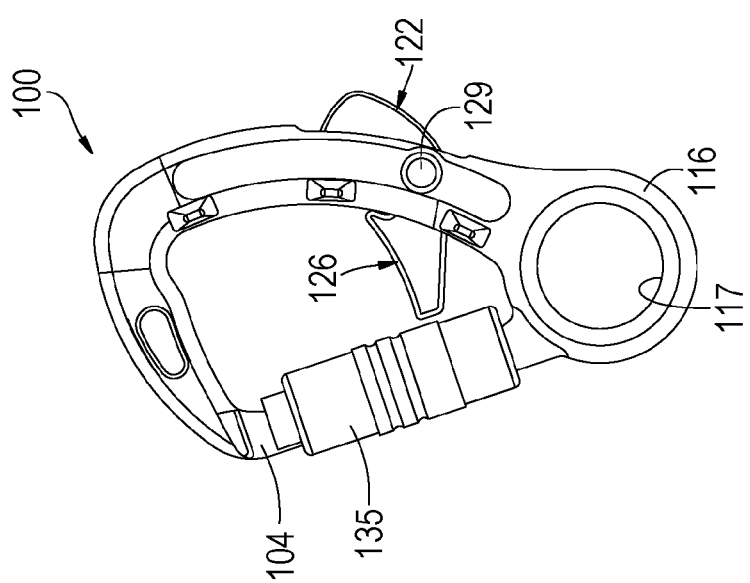
FIG. 2 is a side view of the locking carabiner shown in FIG. 1.
Figure 5:
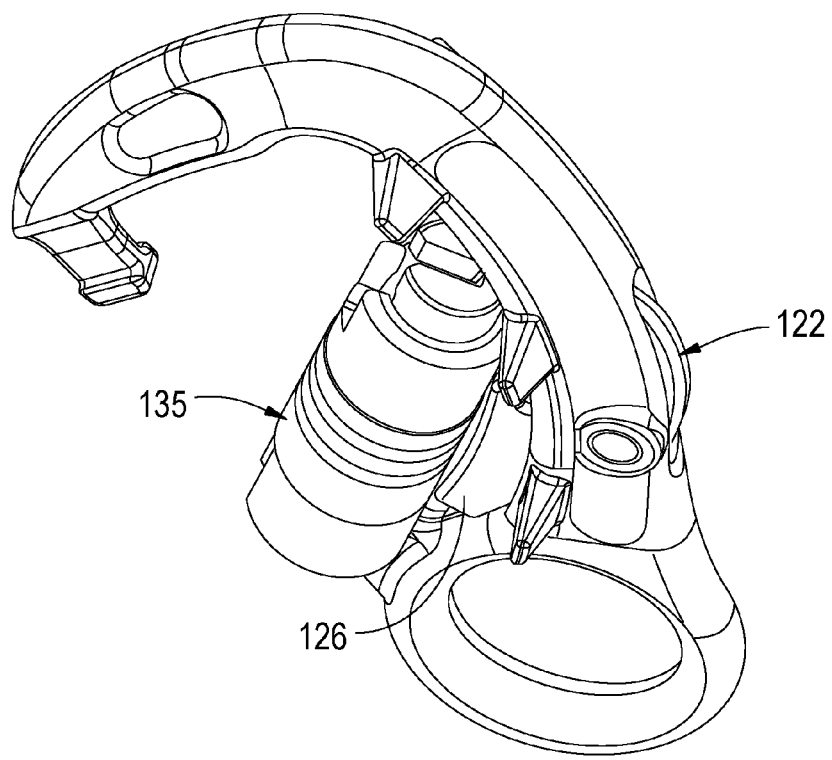
FIG. 5 is a perspective view of the locking carabiner shown in FIG. 1 in unlocked and open positions.
Figure 6:
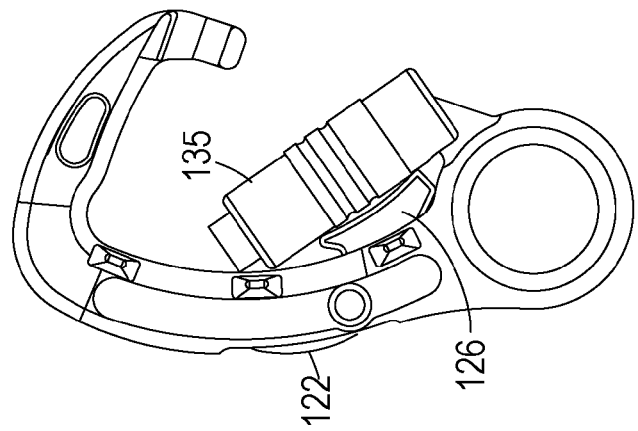
FIG. 6 is a side view of the locking carabiner shown in FIG. 5.
Figure 7:
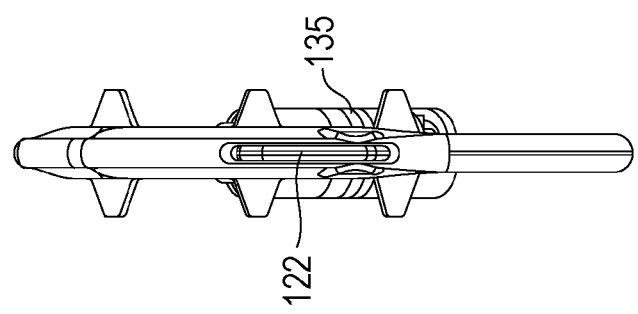
FIG. 7 is a rear view of the locking carabiner shown in FIG. 5.
Figure 8:
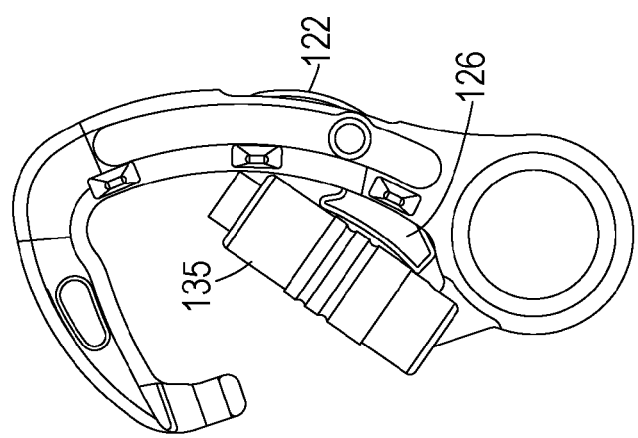
FIG. 8 is a side view of the locking carabiner shown in FIG. 5.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Generally, embodiments of the present invention provide a carabiner including a body, a lock, and a gate. The lock, which is an additional locking mechanism, prevents the gate from inadvertently opening during use.

One embodiment provides a carabiner 100 including a body 101, a lock 121, and a gate 135. The body 101 includes a generally C-shaped hook portion 102 and an eye portion 116. The hook portion 102 includes a side 106 interconnecting a top 103 and a bottom 110. The top 103 includes a generally downward extending extension 104 having a flanged portion 105 at its distal end. The side 106 includes an aperture 107 extending through the sides proximate the juncture between the side 106 and the eye portion 116 and includes a slot 108 extending through the front and the rear proximate the aperture 107 with the aperture 107 and the slot 108 being interconnected or in fluid communication with one another. The slot 108 forms an opening 108c proximate the rear side and an opening 108a proximate the front side. A rib 108b interconnecting the sides extends downward from the top to the middle of the front of the slot 108 so that the opening 108a is smaller than the opening 108c. As shown in FIGS. 9, 11, 12, and 14, there are grooves 108d formed in the sides defining the slot 108, and the grooves 108d are configured and arranged to receive a biasing member such as spring 130. A plurality, three being shown, of optional protrusions 109 extend outward from each side of the side 106. The protrusions 109 are configured and arranged to engage a support structure, such as a wood pole, should a fall occur.

The bottom 110 extends upward from proximate the eye portion 116 opposite the side 106 and includes an aperture 111 and a protrusion 112 proximate its distal end. The aperture 111 is configured and arranged to receive a fastener, such as a rivet, to pivotally connect the gate 135 to the bottom 110. The protrusion 112 extends inward and acts as a stop for the gate 135. The bottom 110 and the top 103 form an opening 114 into a cavity defined by the body 101.

The gate 135 spans the opening 114 and includes a locking mechanism configured and arranged to engage the flanged portion 105 in a locked position. The gate 135 is an example of a suitable type of gate that could be used with the present invention, and it is recognized that any suitable type gate could be used. Other examples include but are not limited to those disclosed in U.S. Pat. No. 6,588,076; 7,540,074; 8,016,073; and 8,060,994. When the top of the gate 135 is pivoted inward, a majority of the opening 114 is accessible. When the top of the gate 135 is contacting the top 103 of the body 101, the opening is not accessible. Proximate the bottom 110 and the side 106 is the eye portion 116, which includes an aperture 117.

The lock 121 includes a trigger portion 122, an intermediate portion 123, and a locking portion 126. The locking portion 126 includes a stop or contact surface 127 at its distal end and a protrusion 128 extending generally upward proximate the intermediate portion 123. The intermediate portion 123 includes an aperture 124, and the trigger portion 122, the intermediate portion 123, and the protrusion 128 form a receiving cavity 125 proximate the aperture 124.

Figure 9:
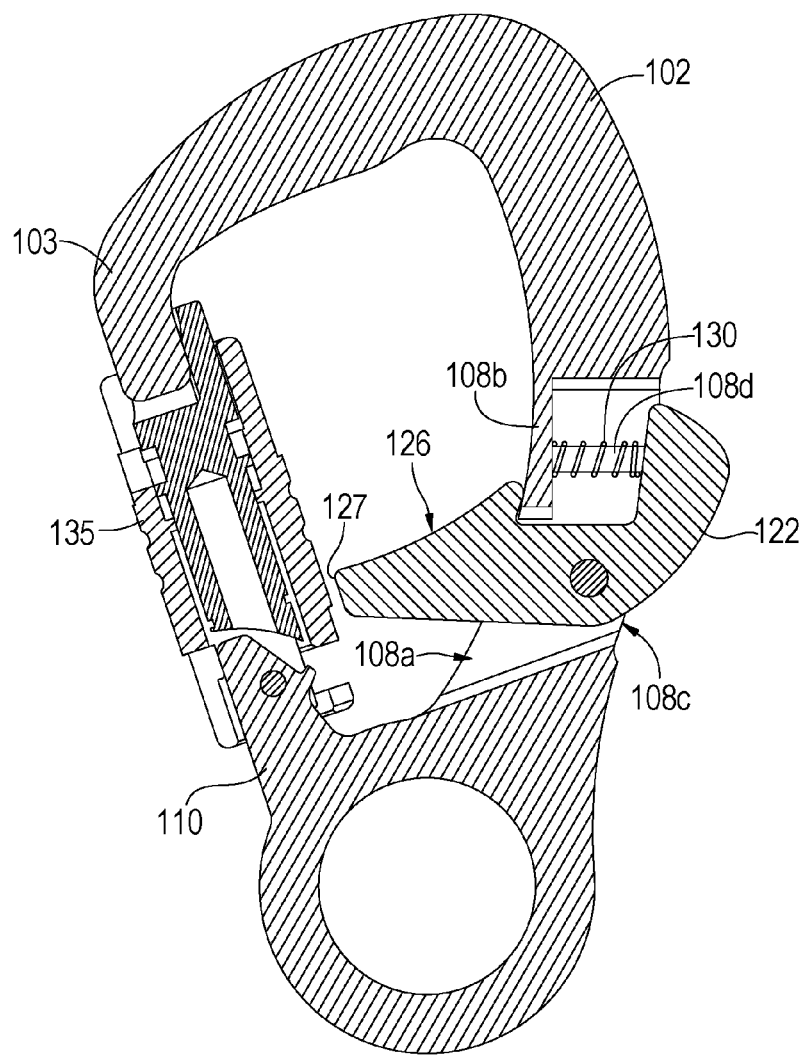
FIG. 9 is a cross-section view of the locking carabiner shown in FIG. 1.
Figure 10:
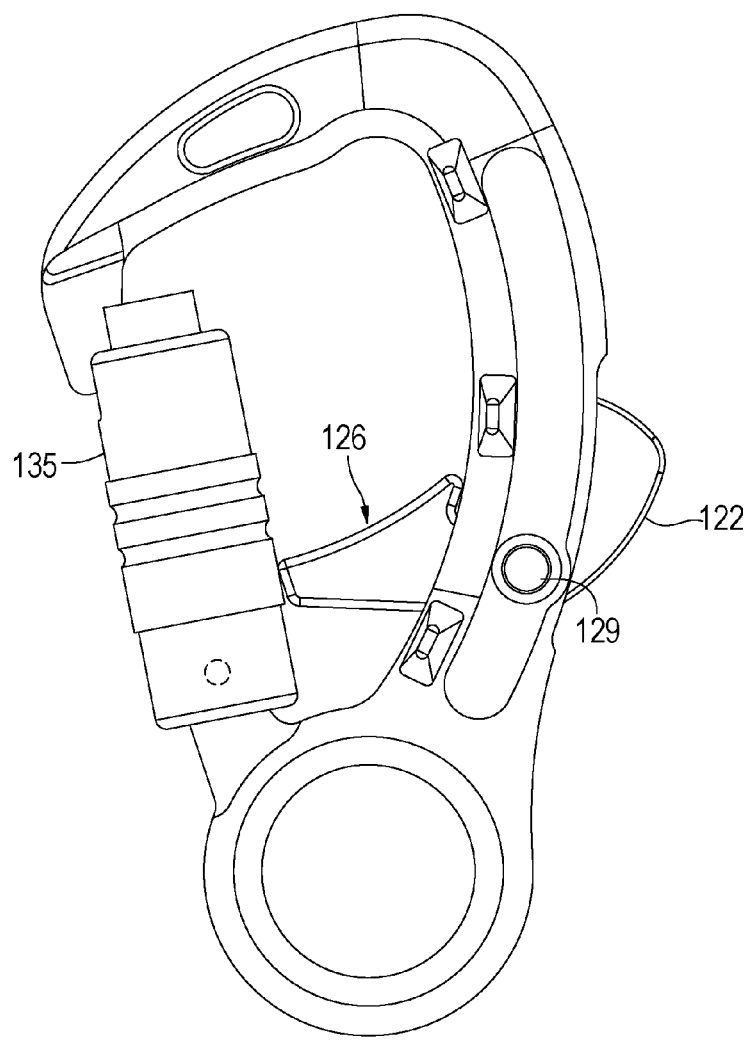
FIG. 10 is a side view of the locking carabiner shown in FIG. 1 in locked and partially open positions.
Figure 11:
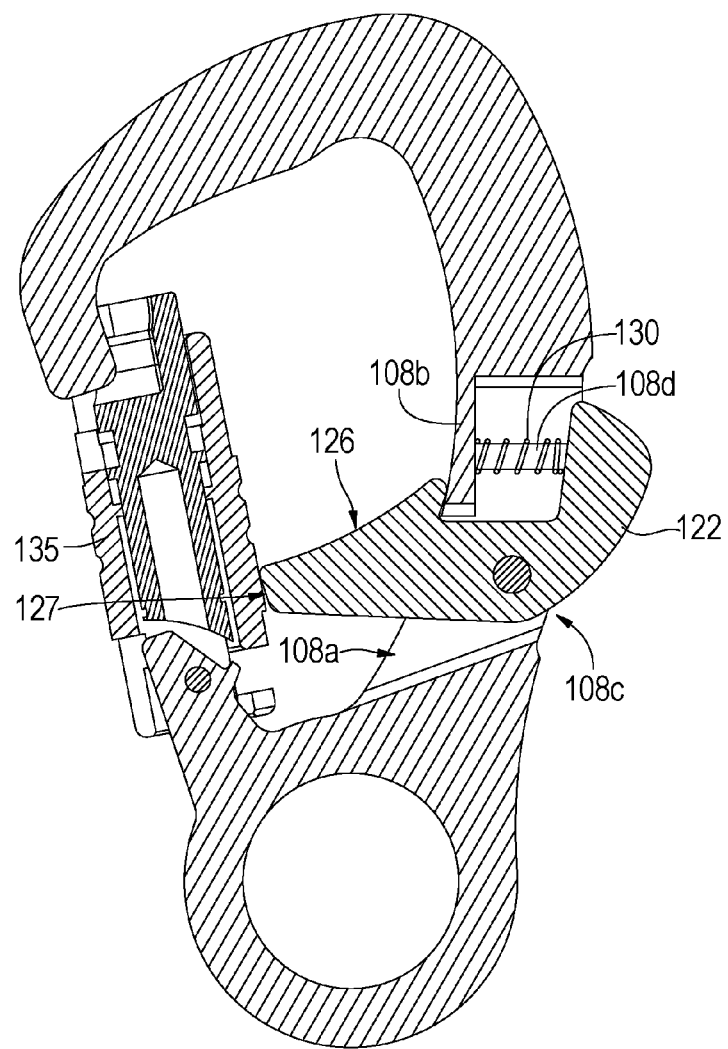
FIG. 11 is a cross-section view of the locking carabiner shown in FIG. 10.
Figure 12:
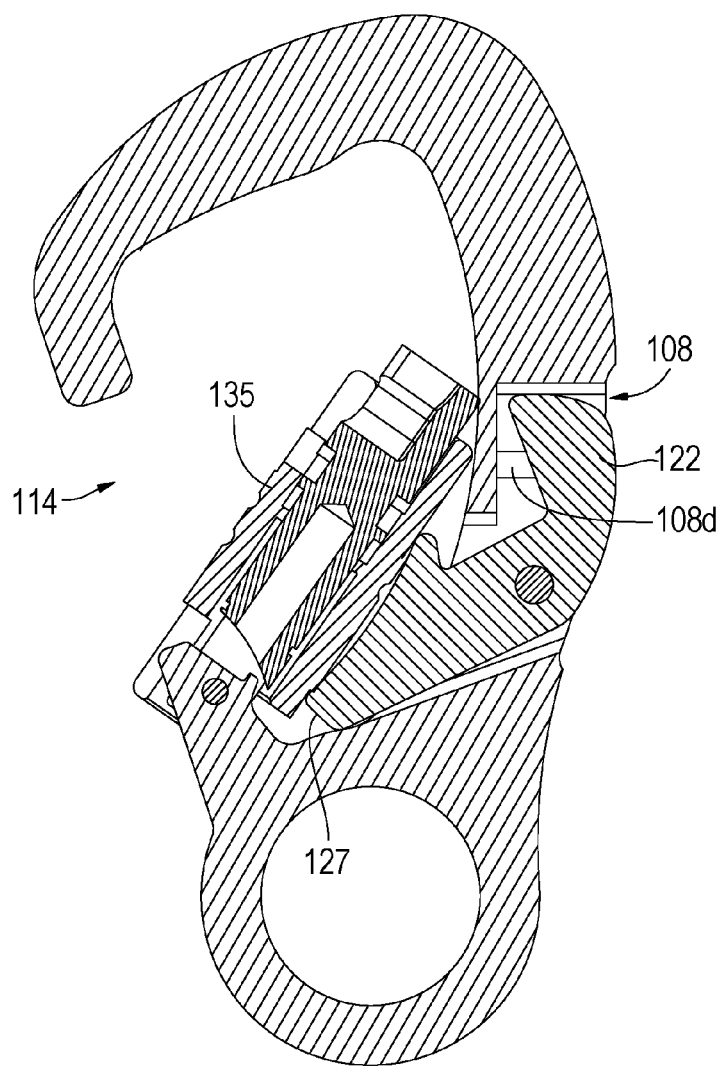
FIG. 12 is a cross-section view of the locking carabiner shown in FIG. 5.

The lock 121 is received within the slot 108. The locking portion 126 extends through the opening 108a, the intermediate portion 123 is positioned within the side 106, and the trigger portion 122 extends through the opening 108c. The lock 121 is pivotally connected to the body 101 with a rivet 129 that extends though the aperture 107 and the aperture 124. A biasing member such as spring 130 is also received within the grooves 108d of the slot 108 and is positioned between the rib 108b and the trigger portion 122 to bias the lock in the locked position as shown in FIG. 9. The spring 130 exerts an outward force on the trigger portion 122, and the protrusion 128 acts as a stop to limit the distance the lock can pivot. When pressure is placed on the trigger portion 122, the biasing force of the spring 130 is overcome thereby allowing the lock 121 to pivot into the unlocked position as shown in FIG. 12.

In use, the gate 135 is opened by moving the lock 121 into the unlocked position, moving the gate's locking mechanism into the unlocked position, and then pivoting the gate 135 into the open position. The lock 121 is moved into the unlocked position by placing pressure on the trigger portion 122 to overcome the biasing force of the spring 130 thereby pivoting the lock 121 from the locked position into the unlocked position. In the locked position, shown in FIG. 9, a majority of the trigger portion 122 extends outward from the rear of the side 106 and the locking portion 126 extends outward toward the gate 135. In the unlocked position, shown in FIG. 12, a majority of the trigger portion 122 is positioned within the side 106 and the locking portion 126 extends downward proximate the eye portion 116.

Figure 26:
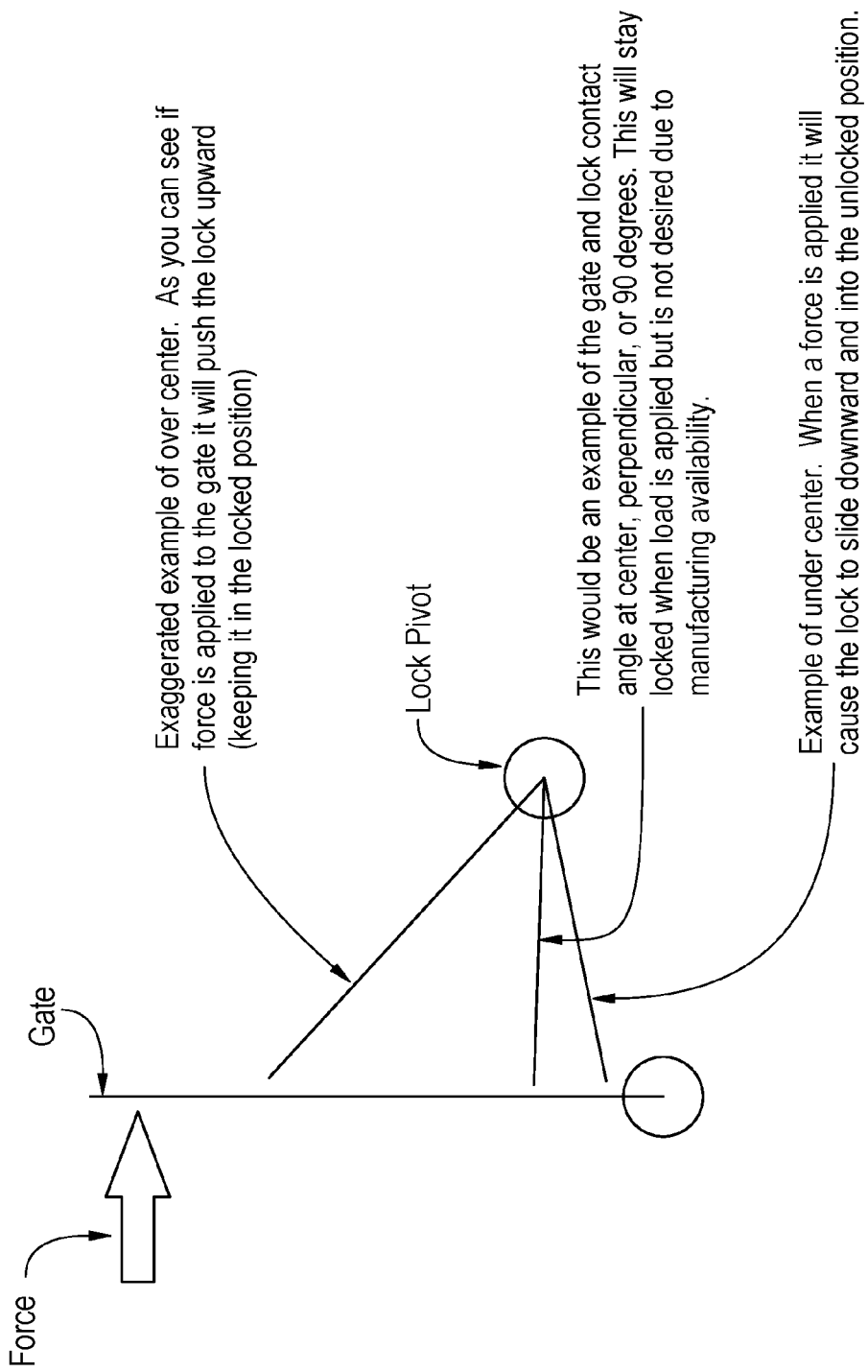
FIG. 26 illustrates a contact angle between a gate and a lock of a locking carabiner constructed in accordance with the principles of the present invention.

The locking carabiner 100 includes an additional locking mechanism located on the body of the carabiner that blocks the gate from swinging open in the event that the gate's locking mechanism is unintentionally defeated. In one embodiment, the contact angle between the gate and the lock is important because the gate could force the lock open if the contact angle is not center or over center. In other words, the contact angle between the gate and the lock is such that when pressure is applied to the gate, the gate will not move the lock from the locked position into the unlocked position. This is illustrated in FIG. 26. If force F were applied to gate G, which pivots proximate pivot point P2, the lock, which pivots proximate pivot point P1, would stay in the locked position if it were either positioned in a center position C, an over center position OC, or any position therebetween. The over center position OC is an exaggerated example and it is recognized that any suitable position over center could be used. In a center position C, the gate G and the lock have a contact angle that is center, perpendicular, or 90 degrees, and the lock will stay in the locked position if a force F is applied to the gate G, which contacts the lock and transfers force to the lock, which pushes the lock in a direction toward the pivot point P1. In any suitable position over center, if a force F is applied to the gate G, the gate G will contact the lock and push the lock in an upward direction, keeping the lock in the locked position. If the lock were positioned in a position under center, then when force F were applied to gate G, the force applied to the lock will push the lock in a downward direction and into the unlocked position, which will no longer prevent the gate G from opening. Alternatively, geometry could be added to stop the relative movement between the lock and the gate once a load has been applied to the gate. For example, the lock could engage a notch or other suitable geometry that caused it to stay mechanically blocked from moving, which would accomplish the same result of acting as a stop to prevent the gate from moving into the open position.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A locking carabiner, comprising:
    a body having a side interconnecting a top and a bottom forming an opening, the side including a slot;
    a gate pivotally connected to the bottom and including a gate locking mechanism releasably connectable to the top, the gate having a closed position and an open position, the gate locking mechanism having an engaged position and a disengaged position, the engaged position preventing the gate from moving from the closed position into the open position; and
    a lock pivotally connected to the side and having a locked position and an unlocked position, the slot configured and arranged to receive the lock, the lock including a trigger portion extending outward proximate a rear of the body and a locking portion extending outward proximate a front of the body, the locking portion configured and arranged to prevent the gate from moving from the closed position into the open position when the locking portion is in the locked position, the locking portion configured and arranged to allow the gate to move from the closed position into the open position when the locking portion is in the unlocked position.

2. The locking carabiner of claim 1, wherein a contact angle between the gate and the locking portion of the lock is over center to prevent the gate from moving the lock from the locked position into the unlocked position.

3. The locking carabiner of claim 1, wherein the body includes an eye portion with an aperture.

4. The locking carabiner of claim 1, wherein the body includes a plurality of protrusions extending outward therefrom configured and arranged to engage a support structure.

5. The locking carabiner of claim 1, further comprising a biasing member configured and arranged to bias the lock in the locked position.

6. A locking carabiner, comprising:
    a body having a side interconnecting a top and a bottom forming an opening;
    a gate pivotally connected to the bottom and including a gate locking mechanism releasably connectable to the top, the gate having a closed position and an open position, the gate locking mechanism having an engaged position and a disengaged position, the engaged position preventing the gate from moving from the closed position into the open position;
    a lock pivotally connected to the side and having a locked position and an unlocked position, the lock including a trigger portion extending outward proximate a rear of the body and a locking portion extending outward proximate a front of the body, the locking portion configured and arranged to prevent the gate from moving from the closed position into the open position when the locking portion is in the locked position, the locking portion configured and arranged to allow the gate to move from the closed position into the open position when the locking portion is in the unlocked position; and
    a contact angle between the gate and the locking portion of the lock, the contact angle being over center to prevent the gate from moving the lock from the locked position into the unlocked position.

7. The locking carabiner of claim 6, further comprising a slot in the side of the body configured and arranged to receive the lock.

8. The locking carabiner of claim 6, wherein the body includes an eye portion with an aperture.

9. The locking carabiner of claim 6, wherein the body includes a plurality of protrusions extending outward therefrom configured and arranged to engage a support structure.

10. The locking carabiner of claim 6, further comprising a biasing member configured and arranged to bias the lock in the locked position.

* * * * *